Jan. 12, 1965 L. W. JACOBS ETAL 3,165,372
CABLE CONNECTOR ASSEMBLY
Filed March 29, 1962 2 Sheets-Sheet 1
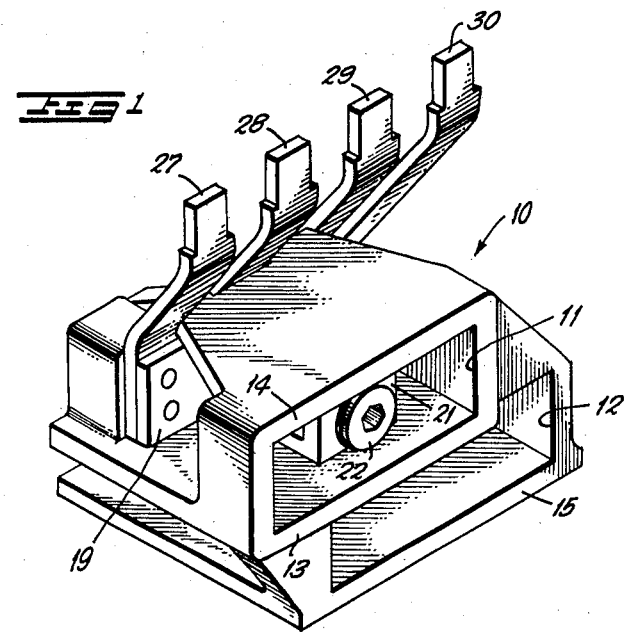
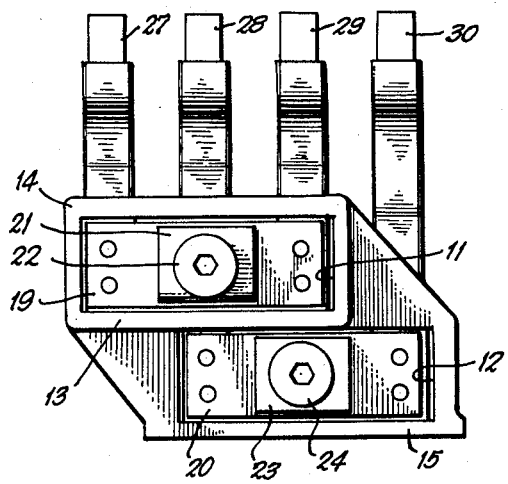
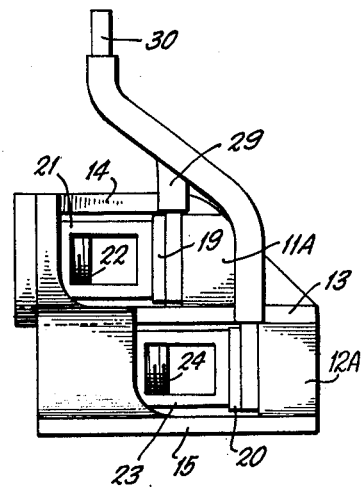
INVENTORS
LEWIS W. JACOBS,
ROBERT J. SABATELLA
BY Robert A. Casey
ATTORNEY Jan. 12, 1965
L. W. JACOBS ETAL
3,165,372
CABLE CONNECTOR ASSEMBLY
Filed March 29, 1962
2 Sheets-Sheet 2
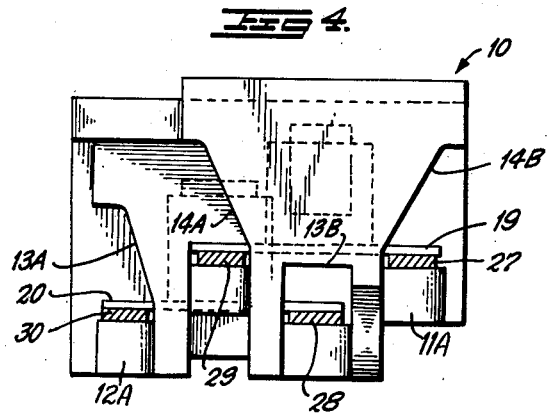
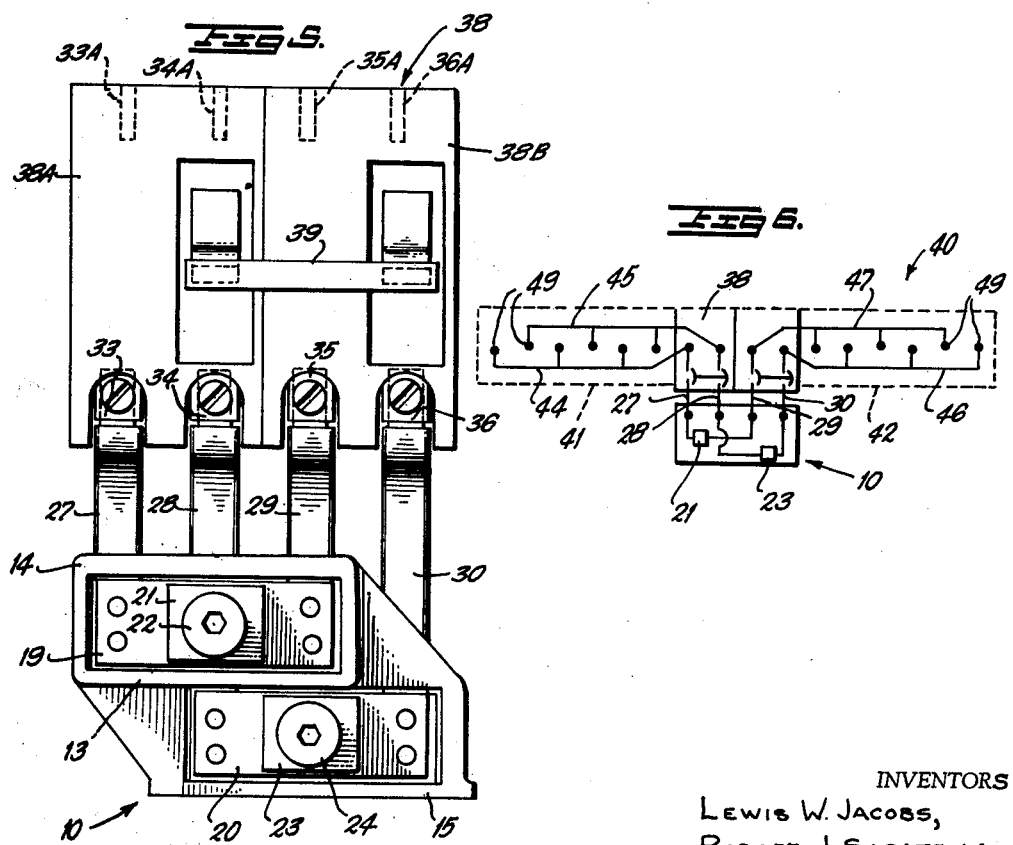
INVENTORS
LEWIS W. JACOBS,
ROBERT J. SABATELLA
BY Robert H. Casey
ATTORNEY

United States Patent Office 3,165,372
Patented Jan. 12, 1965

3,165,372
CABLE CONNECTOR ASSEMBLY
Lewis W. Jacobs, West Hartford, and Robert J. Sabatella, Southington, Conn., assignors to General Electric Company, a corporation of New York
Filed Mar. 29, 1962, Ser. No. 183,555
1 Claim. (Cl. 339—198)

The present invention relates to electrical cable connector assemblies and particularly to a connector assembly for connecting a number of relatively high-capacity conductors to a greater number of relatively low-capacity terminals.

A particular application of the invention relates to panelboard arrangements wherein a plurality of branch circuits are served by an individual panelboard having suitable branch electrical circuits and separate circuit control means for each such branch circuit. Plug-in circuit breakers, fuses, or similar control means are used to provide control of individual branch electrical circuits, and also for control of input power to the individual panelboard. In one type of panel assembly, as shown in application Serial Number 180,540, filed March 19, 1962, now Patent No. 3,141,997 dated July 21, 1964, assigned to the same assignee as the present invention, a pair of separate panel assemblies are provided within a single enclosure, the incoming power being supplied by a single pair of relatively high-capacity cables, subdivided into two pairs of lower-capacity cables, one of each such lower-capacity cables being connected to each separate panel assembly.

Prior available means for connecting two large incoming cables to four lower-capacity terminals, in interleaved fashion as required, are relatively large and expensive. The technique of splicing and taping is extremely time-consuming, while the use of existing types of terminal blocks is also expensive and requires more room than is desirable in such compact structures.

Accordingly, it is an object of the present invention to provide a cable connector assembly for connecting a small number, such as two, relatively high-capacity cables to a larger number, such as four, relatively low-capacity terminals, which is inexpensive, compact, and easily assembled.

It is another object of the invention to provide such a cable connector assembly which comprises a single integral insulating body, and which provides a single pair of input terminals each having a plurality of output branches, the output branches being arranged in alternating or interleaved arrangement.

Briefly, in accordance with the invention, a cable connector assembly is provided comprising a single molded insulating body having wall portions defining two generally rectangular chambers in side-by-side relation, but offset horizontally and vertically with respect to each other. Each chamber contains a single large cable connector and is open at both ends to permit the insertion of a main incoming cable. Each cable connector is mounted on an elongated conductive bar fixed in the base of the chamber, and corresponding side walls of the chambers having portions cut away to permit the entrance of two pairs of branch conductors, each pair of branch conductors being connected to one of the conductive bars in one chamber.

In accordance with the invention in one form, a pair of formed, insulated branch connecting straps are provided, rigidly attached to each of the aforesaid conductive bars, the four ends of the two pairs of connecting straps being interleaved and aligned in a row, and exposed for connection to a row of receiving terminals, such as the terminals of a four-pole circuit breaker.

The organization and operation of the invention may best be understood by reference to the following detailed description, taken in connection with the accompanying drawings, in which:

FIGURE 1 is a perspective view of a new and improved cable connector assembly constructed in accordance with the present invention;

FIGURE 2 is a plan view of the cable connector assembly shown by FIGURE 1;

FIGURE 3 is an end view of the cable connector assembly shown by FIGURE 1;

FIGURE 4 is a side view of the output side of the cable connector assembly of FIGURE 1;

FIGURE 5 is a plan view of the cable connector assembly of the invention shown in one typical use as secured to a four-pole circuit breaker such as may be used to feed a pair of separate panel assemblies each having two main bus bars, and FIGURE 6 is a schematic diagram of the electrical circuit of a panel assembly in accordance with the aforesaid patent application, as used with a cable connector assembly of the present invention.

Referring to FIGURE 1, the invention is shown as embodied in a cable connector assembly 10 comprising a one-piece molded body of insulating material having a step-type arrangement defining off-set terminal compartments 11 and 12. Each of the compartments 11 and 12 is generally rectangular, with at least two open end walls to permit the introduction of electrical power cables to the compartments 11 and 12. The juxtaposed terminal compartments 11 and 12 have a common side wall or barrier 13 therebetween. The compartment 11 has a side wall 14 opposed to and parallel with the common side wall 13, and the compartment 12 has a similar side wall 15 opposed to and parallel with the common side wall 13. The compartments 11 and 12 also have bottom walls 11A and 12A respectively.

The walls of the chambers 11 and 12 are so disposed and arranged that the chambers 11 and 12 are offset both horizontally and vertically with respect to each other, as may be seen from FIGURES 2 and 3.

A base strap or bar 19 of electrically conductive material is secured within terminal compartment 11 by any suitable means, such as by screws, not shown, extending upwardly through the bottom walls 11A. A similar base strap 20 is similarly secured within the terminal compartment 12. A large cable connector or terminal 21 of electrically conductive material is secured to the base strap 19 in the compartment 11 by suitable means such as by brazing to receive a main incoming electrical power cable, not shown, the cable being secured therein by means of a suitable screw or clamping means 22. A similar connector 23 is secured to the base strap 20 in the compartment 12 to receive a second incoming power cable therein, also not shown, and includes suitable clamping means 24.

In a preferred form of the invention, formed and electrically insulated conductor connector straps 27 through 30 are provided, extending outwardly in a direction that is generally transverse to the input direction to the compartments 11 and 12. The connector straps 27 through 30 are positioned in interleaved spaced-apart relation, as shown in FIGURES 1 and 2 with their outer extremities lying in a common plane. These extremities are shown unattached to FIGURES 1 through 3 but are adapted to be connected to input terminals 33-36 of a four-pole circuit breaker, such as circuit breaker 38 shown in FIGURE 5, comprising a pair of juxtaposed circuit breakers 38A and 38B, having a common operating handle, 39.

The connector straps 27 and 29 are secured to the base strap 19, while connector straps 28 and 30 are secured to the base strap 20. Thus, electrical power cable connection to the lug terminals 21, 23 provides a desired parallel connection to the pairs of connector straps 27, 29 and 28, 30, respectively, in interleaved fashion.

The walls 13 and 14 have portions thereof cut away at 13A, 13B and 14A, 14B respectively (see FIGURE 4) to permit the entry of branch connecting straps 28, 30 and 27, 29, respectively.

The schematic representation of the electrical connections of a panel assembly 40 utilizing the new and improved cable connector assembly 10 is shown in FIGURE 6. Panel assembly 40 includes two panel sub-assemblies 41 and 42. Panel sub-assembly 41 includes a pair of generally parallel bus bars 44 and 45, and sub-assembly 41 includes a pair of bus bars 46 and 47. The bus bars 44–47 each have a plurality of spaced-apart contact blades or terminals 49 the terminals of each pair of opposed bars being interleaved to define an aligned row of terminals. The circuit breaker 38 has four output terminals 33A–36A corresponding to input terminals 33–36. Each of the terminals 33A–36A engages a terminal 49 of one of the bus bars 44 through 47. The cable connector assembly 10 as shown by FIGURE 1 through FIGURE 3 is electrically connected to the circuit breaker 38 as shown in FIGURE 5 and as previously described. Parallel connection to bus bars 44 and 47 through the circuit breaker 38 is provided by the pair of conductor connector straps 27 and 29 connected to the lug terminal 21 by the base strap 19. Similarly, bus bars 45 and 46 are electrically connected through the circuit breaker 38 and straps 28 and 30 and to base strap 20, to the terminal 23.

While the cable connector assembly 10 is shown in FIGURE 6 as secured to a four-pole circuit breaker, it will be understood that the cable connector assembly can have use with branch electrical circuits or with other forms of circuit control means and can have use with other forms of panelboard arrangements than the particular arrangement shown in FIGURE 6, and can be used for either power input or power output.

It is contemplated that many modifications of the invention may occur to those skilled in the art; therefore, it is intended that the appended claim shall cover all such modifications as fall within the true spirit and scope of the invention.

What we claim as new and desire to secure by Letters Patent of the United States is:

An electric cable connector assembly comprising:

(a) an insulating body having three parallel side wall portions comprising first and second side walls and an intermediate side wall spaced apart to define two main cable connector chambers;
(b) end walls closing said connector chambers respectively at each end;
(c) said chambers having bottom walls extending substantially at right angles to said side and end walls, said bottom walls being offset with respect to each other in a direction parallel to said side walls;
(d) a connector bar in each of said chambers on said bottom wall thereof;
(e) a main cable connector mounted on said connector bar in each of said chambers;
(f) said first side wall being at least partially cut away to provide a pair of openings;
(g) a pair of branch connector straps extending through said openings in said first side wall into a first one of said chambers, said connector straps having one end thereof rigidly attached to said connector bar in said first chamber;
(h) said intermediate side wall having portions thereof cut away to provide a pair of openings;
(i) a pair of branch connector straps extending through said openings in said intermediate side wall and having one end thereof rigidly attached to said connector bar in said second chamber;
(j) an opening in each of said chamber end walls to receive a cable for connection by a corresponding one of said cable connectors, and
(k) all of said branch connector straps extending outwardly from said insulating body substantially at right angles to the planes of said side walls and in the same direction.

References Cited by the Examiner

UNITED STATES PATENTS

| | | | |
|---|---|---|---|
| 1,203,582 | 11/16 | Chase. | |
| 2,761,113 | 8/56 | Spencer et al. | 339—159 |
| 2,766,436 | 10/56 | Luebking | 339—198 |
| 2,820,211 | 1/58 | Batcheller | 339—198 |
| 2,823,339 | 2/58 | Locker | 317—119 |
| 3,075,039 | 1/63 | Kobryner | 339—198 |

JOSEPH D. SEERS, *Primary Examiner.*